(12) United States Patent
Martin

(10) Patent No.: US 6,416,261 B2
(45) Date of Patent: Jul. 9, 2002

(54) ROTARY PLATE FEEDER

(76) Inventor: Albert Ray Martin, 10 Windsor Ct., Lufkin, TX (US) 75901

( * ) Notice: Subject to any disclaimer, the term of this patent is extended or adjusted under 35 U.S.C. 154(b) by 0 days.

(21) Appl. No.: 09/774,156

(22) Filed: Jan. 30, 2001

Related U.S. Application Data

(60) Provisional application No. 60/179,312, filed on Jan. 31, 2000.

(51) Int. Cl.[7] ............................................. B65G 53/46
(52) U.S. Cl. ................. 406/128; 406/52; 198/550.01; 198/550.2; 198/642; 222/410; 222/342
(58) Field of Search ................. 406/52, 128, 550.01, 406/550.2; 198/642, 410; 222/342

(56) References Cited

U.S. PATENT DOCUMENTS

| | | | |
|---|---|---|---|
| 1,679,398 A | 8/1928 | Bonnot | |
| 1,993,249 A | 3/1935 | Scholz | 88/44 |
| 2,213,508 A | 9/1940 | Wheldon | 221/125 |
| 2,329,948 A | 9/1943 | Shallock | 221/125 |
| 3,820,688 A | 6/1974 | Weiste | 222/193 |
| 4,227,835 A | 10/1980 | Nussbaum | 406/52 |
| 4,789,569 A | 12/1988 | Douche et al. | 427/421 |
| 5,104,230 A | 4/1992 | Douche et al. | 366/156 |
| 5,305,912 A | * 4/1994 | Johnston | 222/1 |
| 5,441,176 A | * 8/1995 | Auee | 222/163 |
| 5,702,183 A | * 12/1997 | Rasimus et al. | 366/195 |

* cited by examiner

Primary Examiner—Christopher P. Ellis
Assistant Examiner—Joe Dillon, Jr.
(74) Attorney, Agent, or Firm—C. W. Alworth

(57) ABSTRACT

A rotary plate feeder valve for use in pressurized pneumatic conveying systems. The valve comprises a rotary plate that is fed from a central inlet and has one or more discharge outlets. Material transfer is controlled by rotary plate speed, depth of deposit of material from the inlet onto the rotary plate, and by plows that move in or out along the rotary plate thus plowing material from the plate into an associated discharge port. Due to high clearances within the valve, the valve may be used with abrasive materials, delicate materials and foodstuffs.

5 Claims, 15 Drawing Sheets

ROTARY PLATE FEEDER

This application claims the benefit of U.S. Provisional Application No. 60/179,312, filed on Jan. 31, 2000.

TECHNICAL FIELD OF THE INVENTION

The present invention relates generally to solids handling and in particular to feeder valves, having little or no air loss, used in pneumatic conveying systems.

BACKGROUND OF THE INVENTION

In pneumatic conveying solid materials (powder, sand, gravel, coal, and the like as well as agricultural products such as seed and foodstuffs) must be moved from a storage facility be it a silo, a bin, a bunker, or similar, into a pneumatic conveying system. The storage facility is generally at atmospheric pressure; whereas, the conveying system is at a different pressure. Generally, the pneumatic system is at a higher pressure, but there are some vacuum pneumatic conveying systems. The conveying system pressure must be isolated from the storage hopper (bin, silo, etc.), and an airlock type valve is generally used for this purpose.

The airlock valve can take several forms. In some systems, the valve can be a simple gate or ball valve, which opens when the conveying system is de-pressured. This allows material to enter the conveying system. The valve is closed, the system pressured, and the material conveyed. This type of system is a batch process system and cannot deliver material at continuous rate.

In order to deliver material at a continuous rate, the conveying system must remain pressured at all times. Thus, in a continuous system, the airlock valve must be capable of delivering material from the hopper and into the system while maintaining system pressure. Finally, in continuous systems, the operator generally wishes to deliver a certain rate of material over time. Thus, the airlock valve should be capable of "metering" the material from the hopper.

The past art has generally employed a "star-valve" that obtains its name from the valve internals, which are shaped like a star. The star is formed about a shaft and is rotated within a circular valve body. The valve internals are a series of circular open sectors starting at the shaft and extending towards the circular wall of the valve body. The width of the sectors is set by the width of the valve body. The valve is placed between the hopper and the pneumatic conveying system. Material enters at the top of the valve and exits at the bottom of the valve. Essentially, material falls, under gravity, from the hopper into a sector, the sector rotates, and the material falls into the conveying system. Each sector within the star feeder valve acts like an airlock. The rate of material injection into the conveying system is determined by the speed of rotation of the star valve.

In order to create "airlock" properties, the stars (or open sectors) must have extremely tight clearances to and between the internal valve body. Basically, the sectors rub against the valve body walls at all times. Because the sectors rub against the walls, material within the sectors experiences grinding or damage. Furthermore, abrasive materials, such as sand, alumna, and the like, will grind the sectors eventually reducing the airlock properties of the valve. Unfortunately, some materials are capable of packing or clumping when exposed to work as exerted by a rotating star valve. These materials often seize a star valve causing damage to the drive motor and valve internals.

Finally, even though the star valve has 'airlock' properties, it is not an efficient airlock. Each sector, as it rotates from the conveying side pressure to the atmospheric side pressure, must equalize in pressure. Thus, air is transferred from the conveying system to the atmosphere (in a pressure system) or from the atmosphere to the conveying system (in a vacuum system). In fact, many star valves incorporate a special venting system, which allows such transfer to occur externally to the valve.

Rotary plate valves may also be used to transfer material from a hopper to a process and are well known in the art. These valves do not grind the material, nor do they suffer the drawbacks of abrasion or binding found in the star feeder. The rotary plate valve consists of a rotating plate upon which material falls, under gravity, and a plow or scrapper. The plow moves across the plate and scraps material from the plate into a discharge port or opening within the valve. The depth of the plow and the speed of the rotating plate control the rate of transfer through the valve. However, the current art in rotary plate valves does not extend to pressure conveying systems. There are some rotary plate feeder valves that may be used under pressure, but as will be seen these are somewhat limited in their application. Specific examples of the prior art may be found in the following series of U.S. patents.

Bonnot, U.S. Pat. No. 1,679,398, discloses a Disk Feeder for use in the coal industry and is probably one of the earlier disk feeders. Coal (or a similar material) is fed from an offset hopper onto a rotating disk and a scrapper blade removes the coal from the disk. The offset hopper barely touches the rotating disk and has a hole cut on one side of the hopper that allows material to fall onto the disk. A rotary sleeve valve rotates about the hopper and adjusts the amount of material falling onto the hopper. The scrapper blade is fixed. This early apparatus was designed solely for use in an atmospheric pressure environment.

Scholz, U.S. Pat. No. 1,993,249, discloses a Fine Coal Feeder that is a variation of Bonnot. Scholz places a hopper over a rotating disk, and the eccentricity of the hopper may be varied from zero eccentricity (i.e., over the center of the disk) to maximum eccentricity (at the edge of the disk). The eccentricity adjustment provides adjustment of "feed" to the system. Coal is then scrapped from the disk into a downcomer and into the place of use (in this case a boiler). Again, this device was designed for use at atmospheric pressure.

Wheldon, U.S. Pat. No. 2,213,508, discloses a Feeder for Pulverulent Material. Wheldon places a hopper over the center of a rotating disk. The hopper has an opening in the side next to the rotating disk, and an adjustable "scrapper" extends through the opening. The scrapper is hinged at one end and may swing into the hopper or line up against the wall of the hopper. In the later position, no material feeds from the system. As the scrapper is positioned into the hopper, material is caused to flow from the hopper, across the disk and onto a conveyor belt. Once more this device was designed for atmospheric pressure.

Shallock, U.S. Pat. No. 2,329,948, discloses a Feeder Means that is similar to Wheldon in that a hopper is placed over the center of the rotating disk. The means for controlling the removal of material is quite different and uses a triangular shaped extension inside the hopper that is in contact with the disk. The extension serves to hold a wedge valve that allows material to flow from the hopper onto the disk and serves also scrap the material from the disk. (Essentially the triangular extension serves two consecutive purposes. Material then follows the extension and drops from the disk into the process. This device was also designed for atmospheric pressure.

Weiste, U.S. Pat. No. 3,820,688, discloses a Material Dosaging Apparatus that is designed for use in pneumatic systems. The apparatus is designed to mix different amounts of material (up to four) into a common stream for conveying. Weiste uses a modified disk in the form of a tub with an outside wall and a center conical section with an opening. An ejector is placed immediately above the opening through which pneumatic conveying air is passed. The ejector causes a partial vacuum, which draws material from the rotating tub into the conveying system. Material falls onto the tub from circular supply hoppers through a form of gate valve. The gate valves regulate the quantity of material falling onto the rotating tub and consequently into the conveying system. The individual hoppers are vented to atmospheric pressure and atmospheric air is permitted to flow through the hoppers to assure movement of material from the hopper. It is apparent that the design requires the supply hoppers to be at atmospheric pressure and that material is "sucked" into the conveying system.

Nussbaum, U.S. Pat. No. 4,227,835, discloses an Apparatus for the Metered Supply of Powder to a Power Processing Unit that is designed to operate independently of atmospheric pressure. This device uses a rotating disk with a groove machined into the plate. A hopper, which is in tight direct contact with the moving disk, drops power into the groove on the disk. The powder moves around in the groove and is sucked from the groove by a suction device. The groove and the hopper may be operated up to 3.5 bars. Power is metered by two techniques. The first is a "doctor" member located at the hopper that is designed to pass a specific fixed amount of powder onto (or into) the groove. The second uses rotation of the disk that sets the quantity of power that may be draw up by the suction device. This device, although capable of operation at pressure, depends on very close tolerances and would suffer considerable wear when used with abrasive materials. Furthermore, the unit would not work well with loose (corn chips) material.

Douche et al, U.S. Pat. Nos. 4,789,569 and 5,104,230 disclose a Process and Device for Metering Pulverulent Materials. This device is similar to the device of Nussbaum in that a disk with a metering groove is utilized. A "doctor" is not used with the hopper that operates at atmospheric pressure. A series of pads extends from the hopper and wipe excess material from the plate so that only the groove is filled with material. A suction device then picks up the metered material. The device suffers from similar drawbacks, as does the Nussbaum device.

The Nussbaum and Douche devices rely on vacuum pickup of the metered material. In normal pneumatic operations, both sides of the conveying system can operate at pressures greater than atmospheric pressure. None of the devices in the prior art disclose a metering system that will operate at pressure in a pneumatic conveying system.

Thus, there remains a need in the pneumatic conveying industry for a feeder valve that will act as an airlock valve with a variable injection rate while not grinding or sheering the material that is being conveyed or injected into the conveying system. Additionally, there remains the need for a feeder valve that will reduce or even eliminate the possibility of material buildup and binding within the valve internals.

SUMMARY OF THE INVENTION

It is an overall object of the present invention to provide a feeder valve that does not suffer the disadvantages of the rotary star or groove feeder valve. The instant feeder valve is essentially a rotary plate feeder valve, with a perimeter seal extending about the circumference of the rotating plate except at the discharge opening (or discharge openings in other embodiments). The valve may incorporate a movable sleeve that controls the depth of the material being deposited on the rotary plate and incorporates a movable plow (or plows in other embodiments) that controls the material being deposited into the discharge opening. The rotating disk is driven by a speed controlled motor external to the valve. The shaft connecting the motor and the rotating plate is sealed. In normal use, both the valve internals and the storage hopper (bin, silo, or the like) is maintained at the conveying system pressure by pressure means attached to the storage facility that follows the conveying system pressure.

It is possible to keep the hopper at atmospheric pressure and the discharge port at a much higher pressure. This would require a backup shutdown valve that would prevent backflow, if the hopper ran out of material. The backup shutdown valve would be placed on the outlet side of the discharge port(s).

Additional discharge ports may be added to the valve (during manufacture) thus allowing one valve to feed two conveying systems, provided the systems operate at the same pressure. Additional plows and associated ports may be incorporated in the valve which will reject material that is too large or too small; thus, allowing the valve to discriminate between different material sizes. The valve is manufactured so that different flanges may be mated to the valve body; thus satisfying many sizes of pipe and flange with a given minimum number of valve bodies.

DETAILED DESCRIPTION OF THE INVENTION

Figure 13:
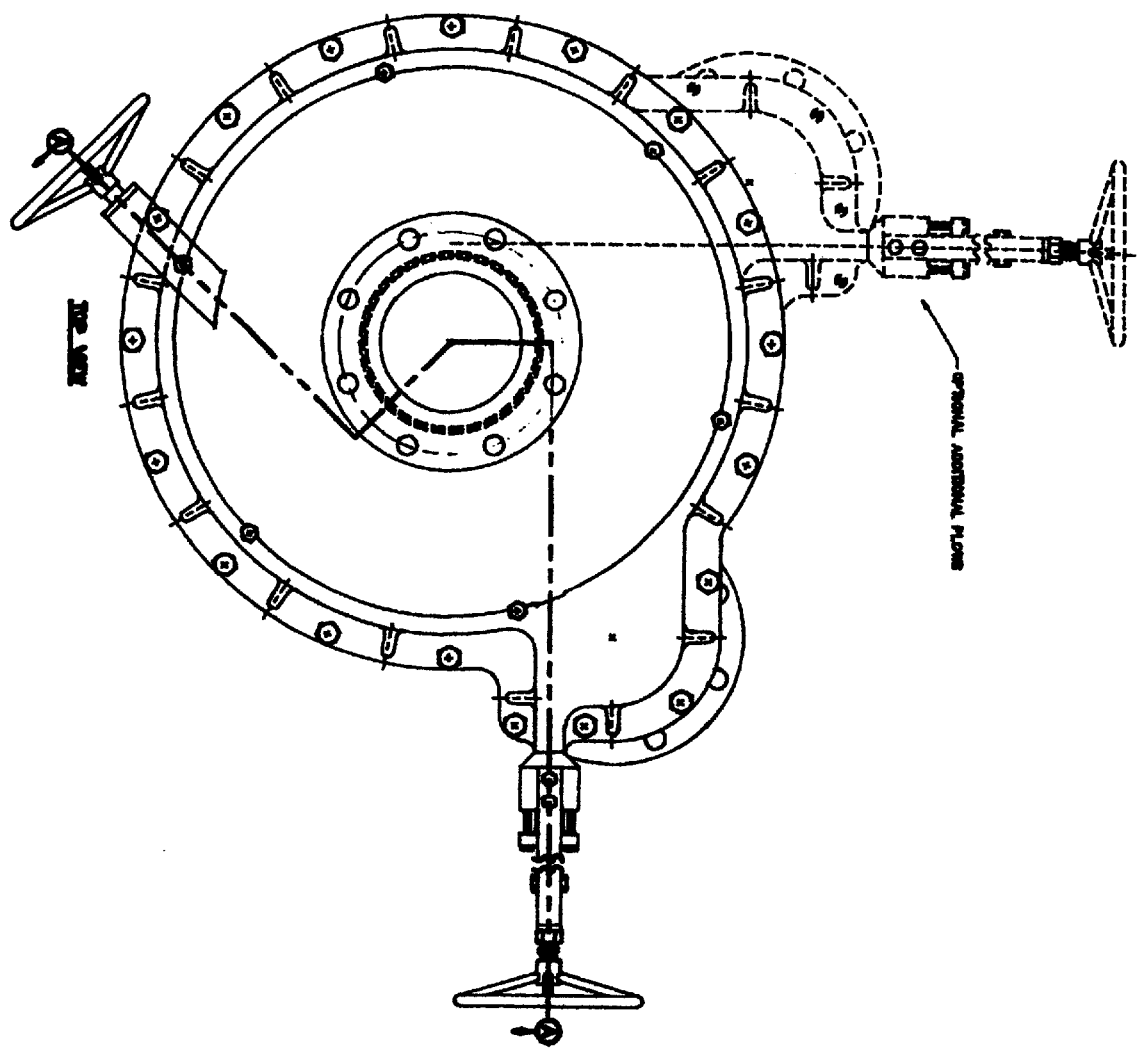
FIG. 13 is an engineering top view of a prototype of the instant invention.
Figure 14:
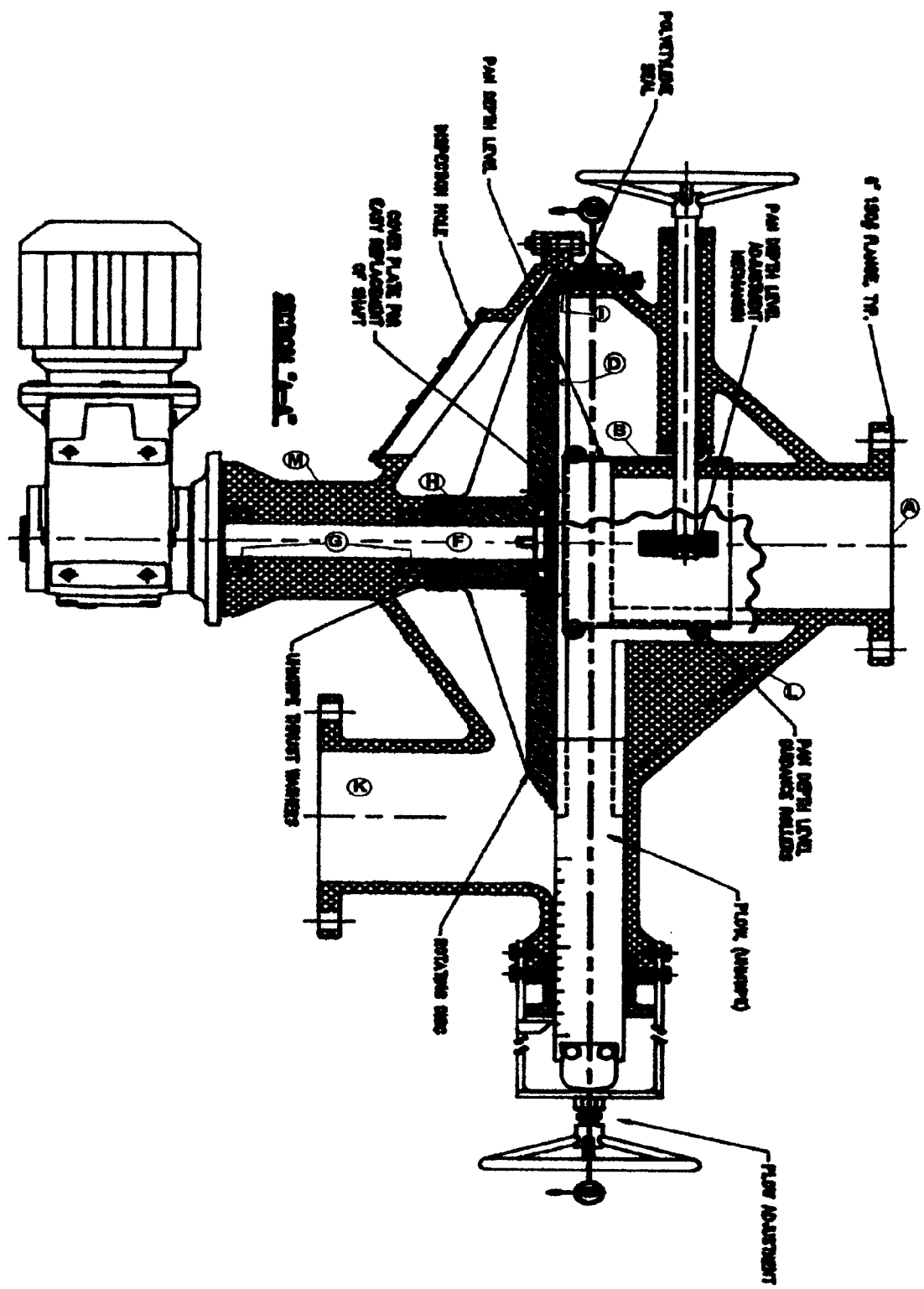
FIG. 14 is an engineering side section view of the prototype of the instant invention, taken at A—A in FIG. 13, showing the valve internals.
Figure 15:
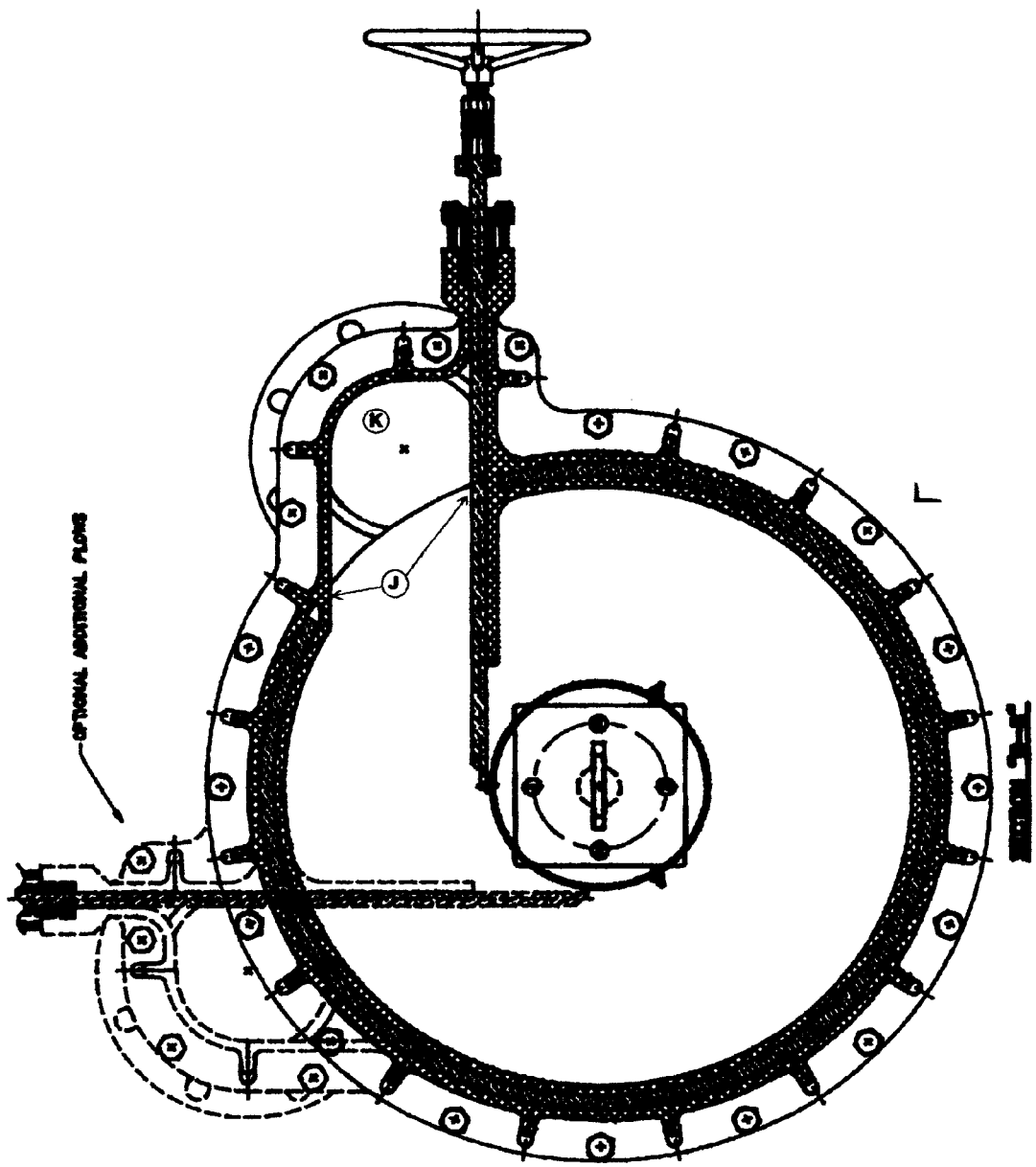
FIG. 15 is an engineering top section view of the prototype of the instant invention, taken at B—B in FIG. 2.

FIGS. 1 through 10 and 12 are simplified figures illustrating the salient features of the instant invention. FIGS. 13 through 15 are engineering drawings of a prototype of the instant invention showing a 150# flange on the inlet and discharge ports. The actual valve body of the instant invention is cast (or manufactured) without a flange; however, the body includes a flange mating section. The flange mating section is welded (or otherwise attached) to a suitable flange to meet the requirements of the user.

Figure 1:
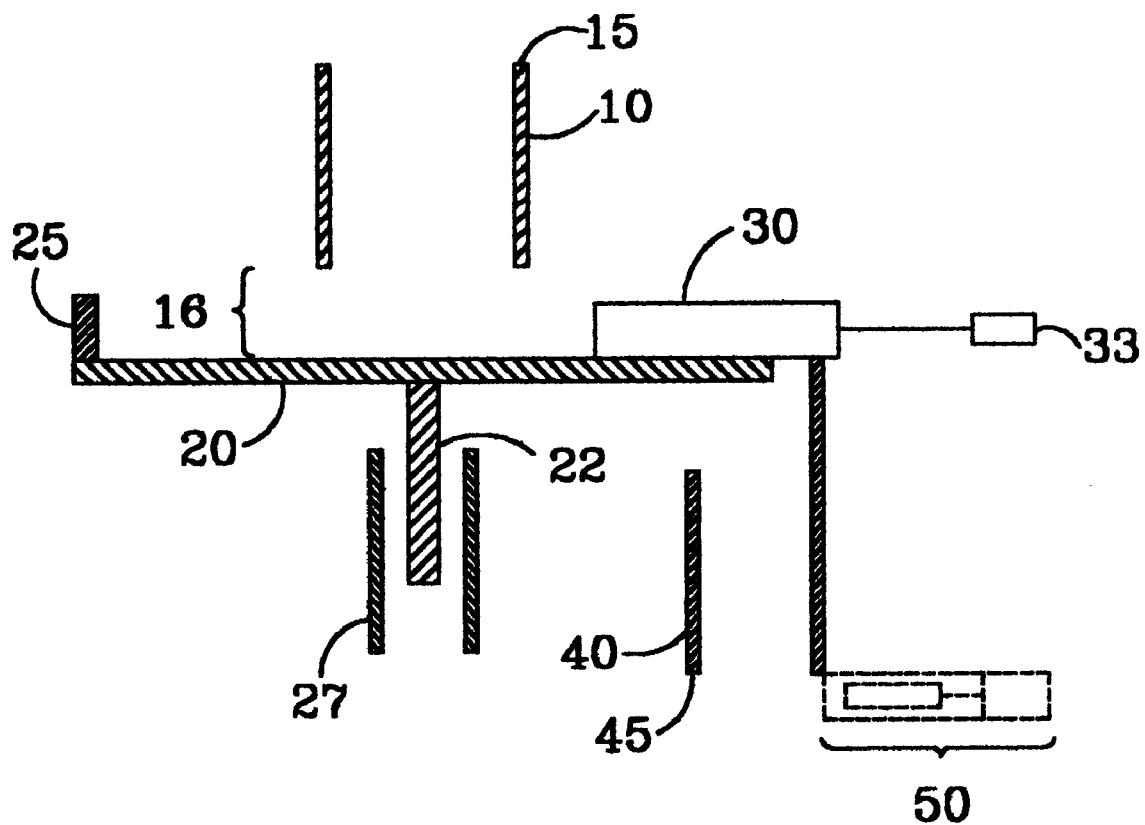
FIG. 1 is a simplified side view of the instant invention.
Figure 9:
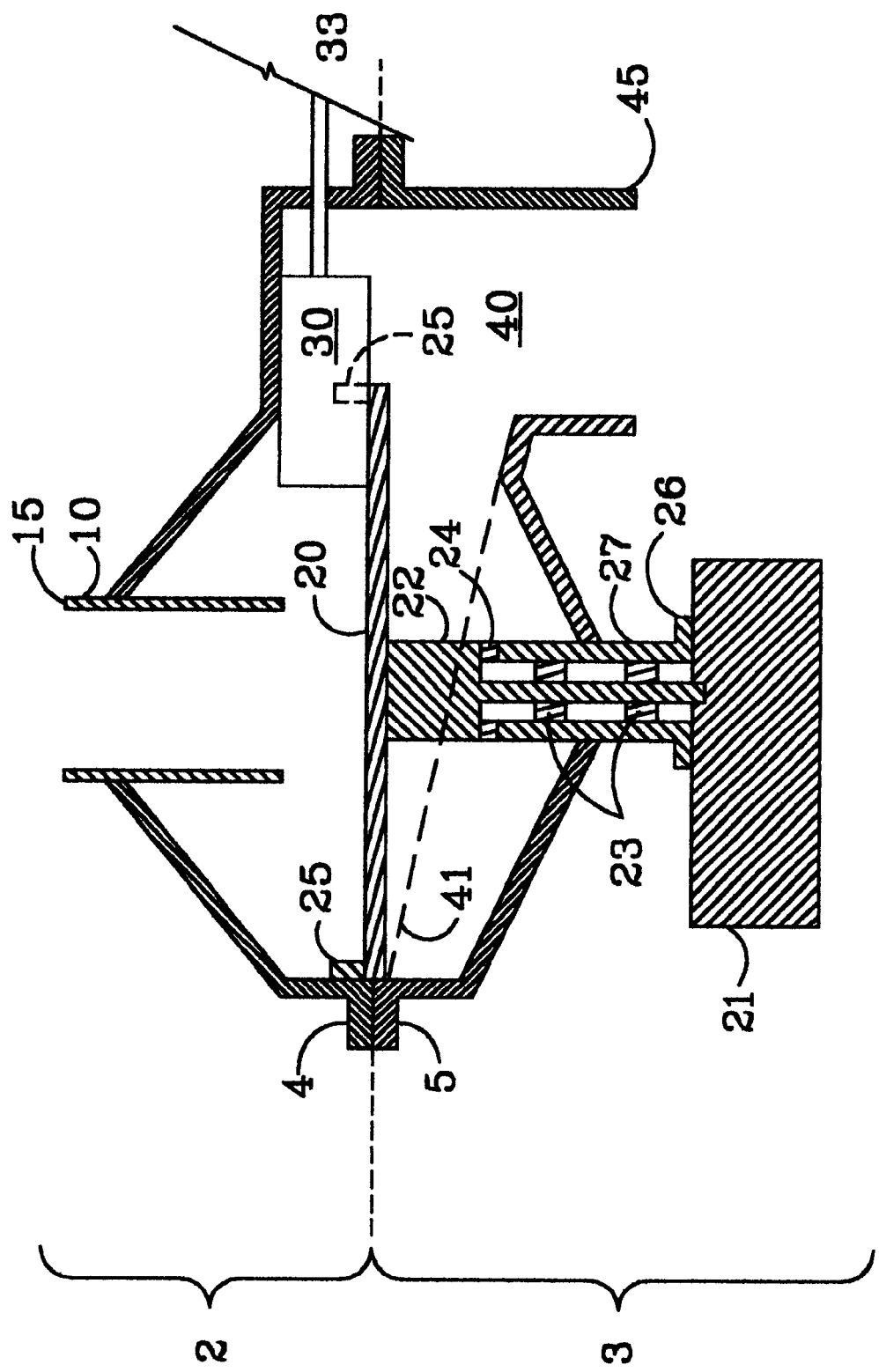
FIG. 9 is a side view of the single discharge embodiment of the instant invention showing the essential elements of same.
Figure 10:
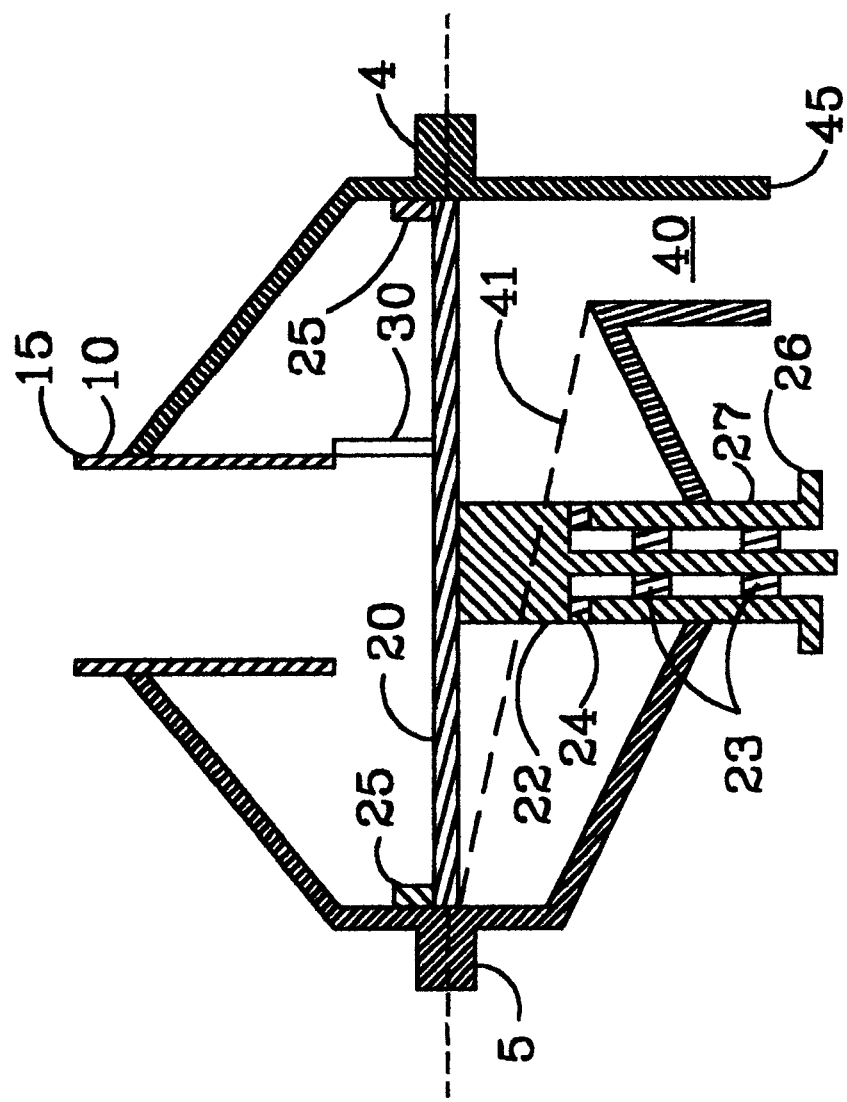
FIG. 10 is similar to FIG. 9 rotated slightly to illustrate the alignment of the discharge port with its associated slope line.
Figure 11:
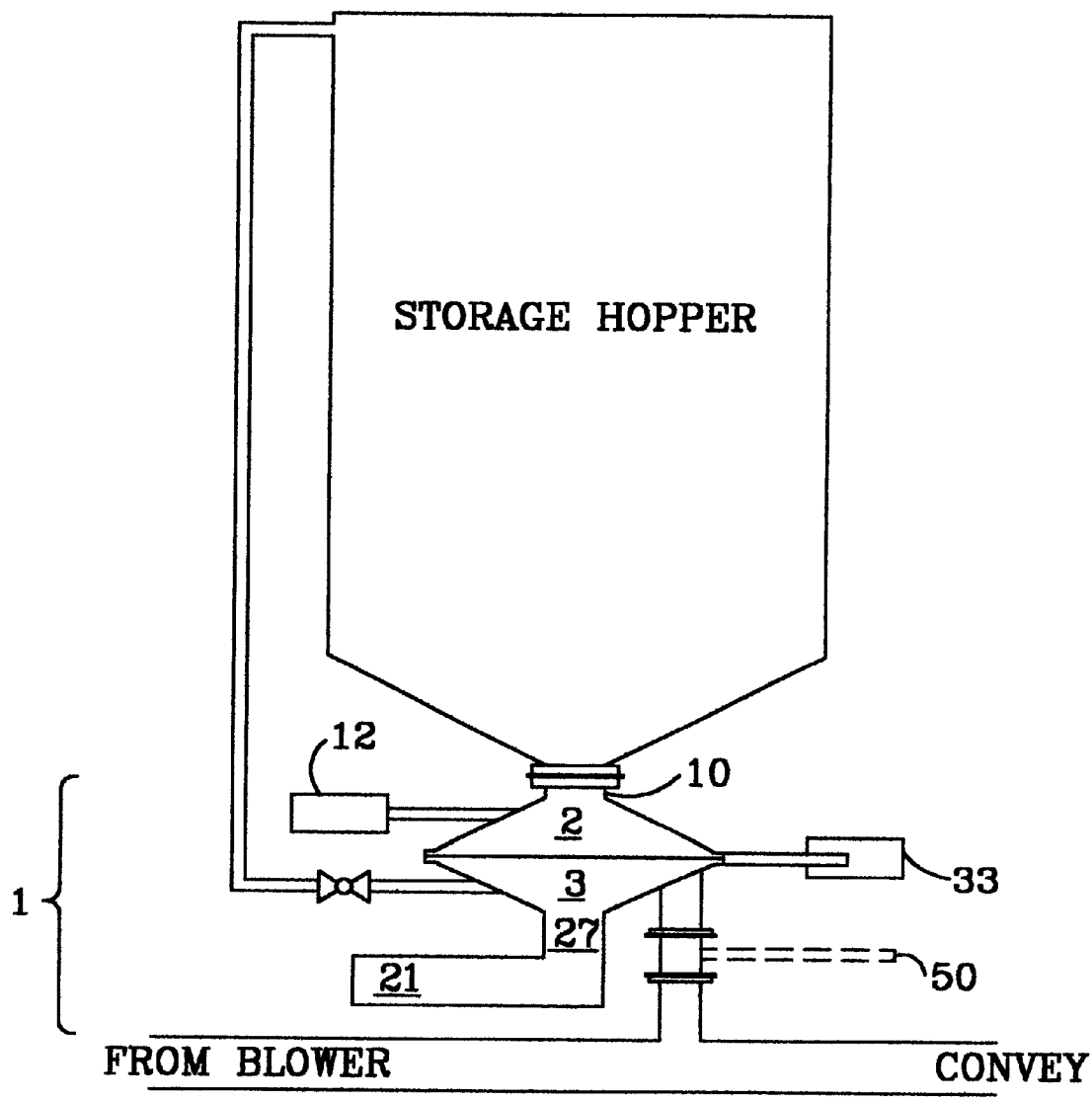
FIG. 11 illustrates a typical installation showing the pressure control of the storage silo and the feeder valve.
Figure 12:
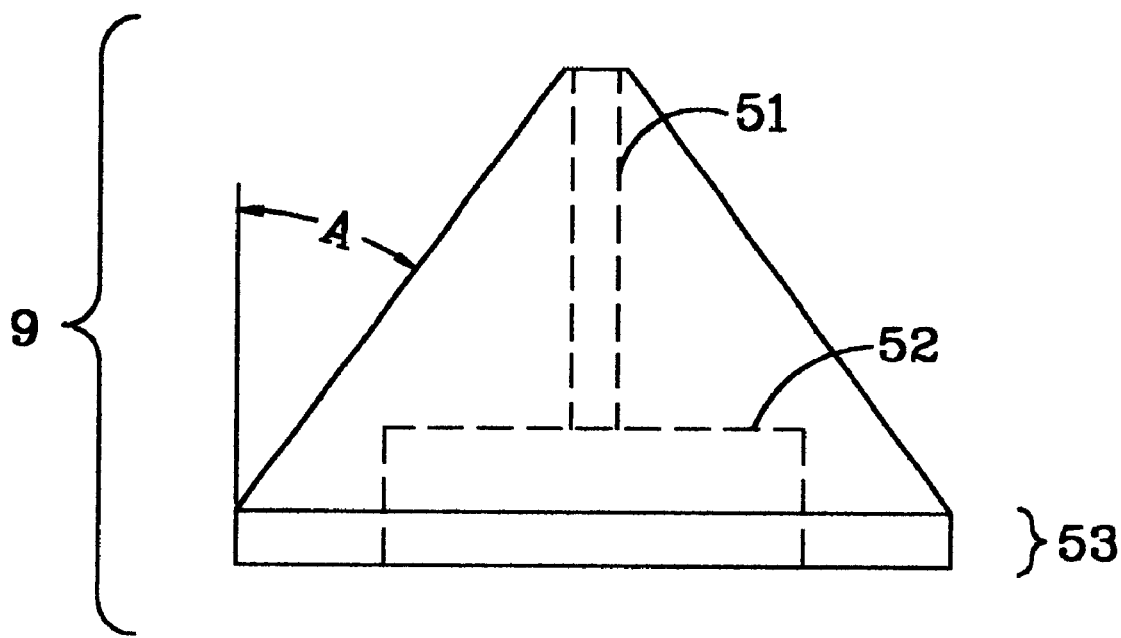
FIG. 12 illustrates an adapter or ancillary inlet cone used in certain circumstances to prevent material from being deposited at the center of the feeder plate.

Referring to FIGS. 1 and 9, the material to be conveyed or handled, enters the rotary plate valve, generally 1, through inlet, 10, located in the center of the valve in the upper portion of the upper casing, 2. As shown in FIG. 11, the inlet is connected directly (or through piping) to a storage facility (silo, bin, hopper, bunker or the like). The material drops down onto a rotating plate, 20. The distance, 16, between the plate, 20, and the inlet nozzle, 10, as it extends into the valve, fixes the depth of material deposited on the plate.

Figure 2:
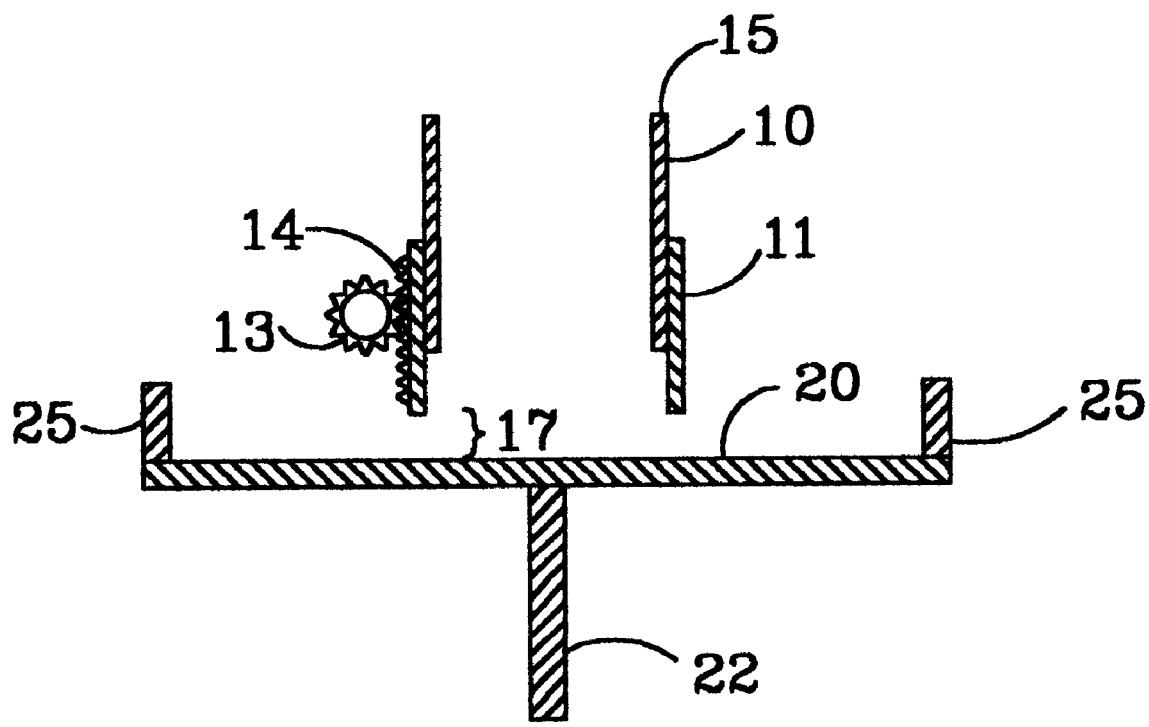
FIG. 2 is a simplified side view of the instant invention showing the feed-level control sleeve.
Figure 3:
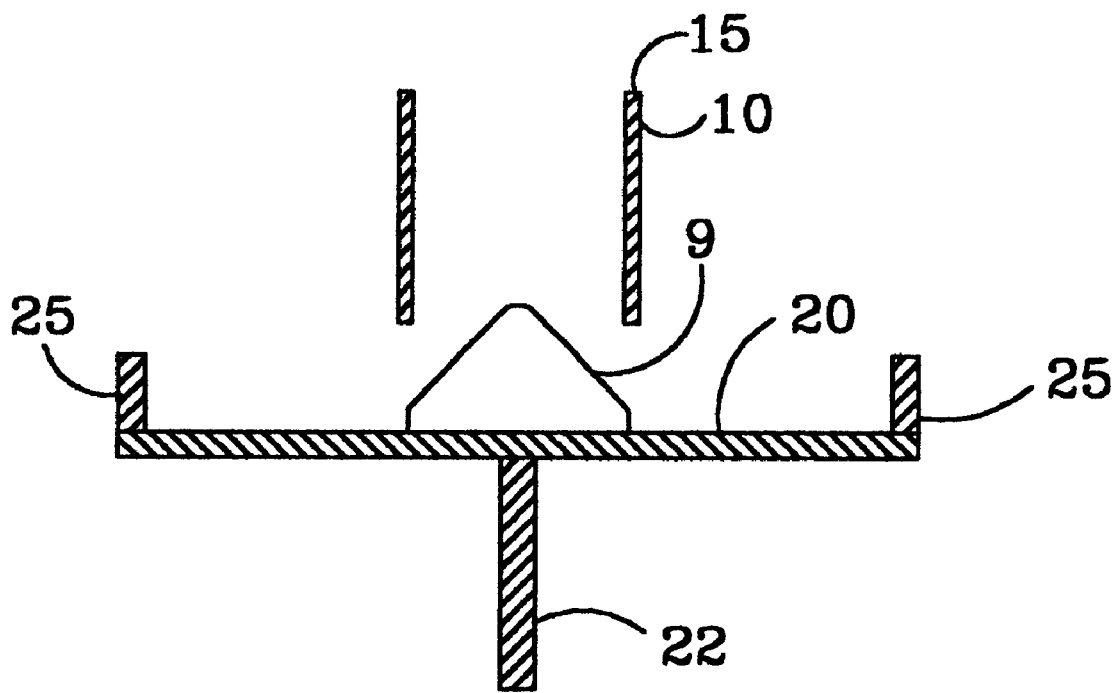
FIG. 3 is a simplified side view of the instant invention showing the optional feed cone in place on the rotating feed plate.

An alternate embodiment is shown in FIG. 2 in which the material passes through a movable sleeve, 11. The movable sleeve controls the depth of the material deposited on the rotating (rotary) plate, 20 by varying the distance between the plate and the inlet nozzle, 17. Gear and tooth assembly, 13 and 14, in turn control the movable sleeve. Not shown is control means for regulating the position of the moveable sleeve, 11. (FIGS. 13–15 illustrate a control wheel; however, the control means may be a stepper motor, a hydraulic motor, or similar means that may be used to adjust the sleeve position remotely from a control room.) FIG. 11 shows the control means, 12, for regulating the position of the sleeve.

A controllable speed motor, 21, rotates the rotary plate, 20, mounted on the bottom of the valve, the lower section of the casing, 3, by flange or mounting means 26. A vertical shaft assembly, 22, couples power from the motor to the rotary plate. The shaft is supported vertically by two sets of bearings, 23. The entire rotary plate and associated shaft assembly is supported by thrust bearings 24. The vertical and thrust bearings are supported within a bearing case, 27, which is an integral part of the lower casing, 3, of the instant device.

The bearings are preferentially Ultra High Molecular Weight Polyethylene (UHMWP) sleeves or discs. (Note—other bearing plastic materials would have to be used in high temperature conditions; however, those skilled in the art of materials would have no problem choosing the appropriate material. Under some circumstances, standard sealed roller or ball bearing assemblies would be chosen, but again a person skilled in the art of bearing selection would have no problem in selecting the proper bearing.)

A perimeter seal, 25, follows the perimeter (or circumference) of the rotary plate and prevents material from leaving the plate. The perimeter seal rests on the top of the rotary plate and is held in place, within the lower portion of the upper casting, 2. The perimeter seal is open (or not present) at the discharge port (or ports in the alternate embodiments) that allows material to fall from the rotary plate into the discharge port (or ports). See in particular FIG. 5 that shows the seal extending about the rotary plate perimeter except at the discharge port. The seal is manufactured from a suitable polyethylene material such as UHMWP (see earlier); however, temperature considerations could readily enter the picture. A normally skilled person can readily determine the choice of the correct material. (For example, a specialty plastic known as FLORASCINT may be used.) In the case of abrasive materials Silicon Carbide Segmented materials may be employed.

The rotary plate is designed to turn in a clockwise direction (although the same principal would apply to counterclockwise motion with certain modifications to the internals). As the plate rotates in a clockwise direction, material deposited on the plate will be scrapped-off (or plowed-off) by the plow, 30, and fall into the discharge port, 40. The quantity of material falling into the discharge port is regulated by:

1) the depth of the material, fixed or set by the depth control sleeve,
2) the insertion of the plow, set by the plow control, and
3) the speed of rotation, set by the motor control.

With careful control of the above parameters the flow (or quantity) of material being conveyed by the conveying system may be regulated.

The plow would be manufactured from UHMWP (see earlier); however, the same discussions regarding the choice of material for the perimeter seal would apply. Thus, a normally skilled person would be able to choose a suitable material for the plow(s). UHMWP material allows the plow to ride on the plate without permitting abrasive to seize the plate and allows fragile material to be handled by the valve.

The plow insertion point is controlled by an insertion control means, 33. In the engineering prototype a hand wheel assembly was used as shown in FIGS. 13–15. The insertion control means may be a stepper motor, a hydraulic or pneumatic actuator, or the equivalent, and may be controlled from a control room.

The valve is divided into two casings, a top, 2, and a bottom, 3. The top casing includes the inlet opening or nozzle, 10, the alternative pan depth level adjusting mechanism, 11 through 14, and the upper portion of the plow mechanism, 30 and 33. The upper casing can be considered as having an upper portion and a lower portion. The bottom (or lower) casing includes the rotary plate assembly (bearings etc.) the discharge port (or ports), the bearing case, 27, and the lower portion of the plow assembly. The lower casing can include an inspection port or additional discharge ports and can be considered as having an upper section and a lower section.

The two casings are bolted together along a common parting line by flanges 4 and 5, as shown in FIGS. 9, 10 and 13 through 15.

The prototype system demonstrated that under some circumstances, material build-up could occur between the lower casing and the disk. To reduce this problem, the lower casing may be sloped as indicated by line, 41, shown in FIGS. 9 and 10. This slope is associated with the discharge port and runs from the midpoint on the casing circumference to the port. Essentially, there may two such slopes associated with a discharge port. The slope should be on the order of two to four inches.

The split casing arrangement allows the entire feeder internal mechanism and the material being handled to be maintained under a controlled pressure condition—namely under the same conditions as the conveying system. This is clearly shown in FIG. 11. The arrangement prevents any possible contamination of sensitive products from external sources.

It is possible to operate the instant device with an atmospheric pressure hopper. The hopper would have to be maintained as full as possible to prevent backflow from the higher-pressure discharge port. The plow running against the plate and optional cone with material falling onto the plate would prevent backflow. However, a discharge port shutdown valve, 50, as shown in FIG. 1 (and as a dashed-line option in FIG. 11) should be incorporated into a system using the instant device. The shutdown valve would be automatically closed, by an external control system, if and when backflow conditions existed.

Figure 6:
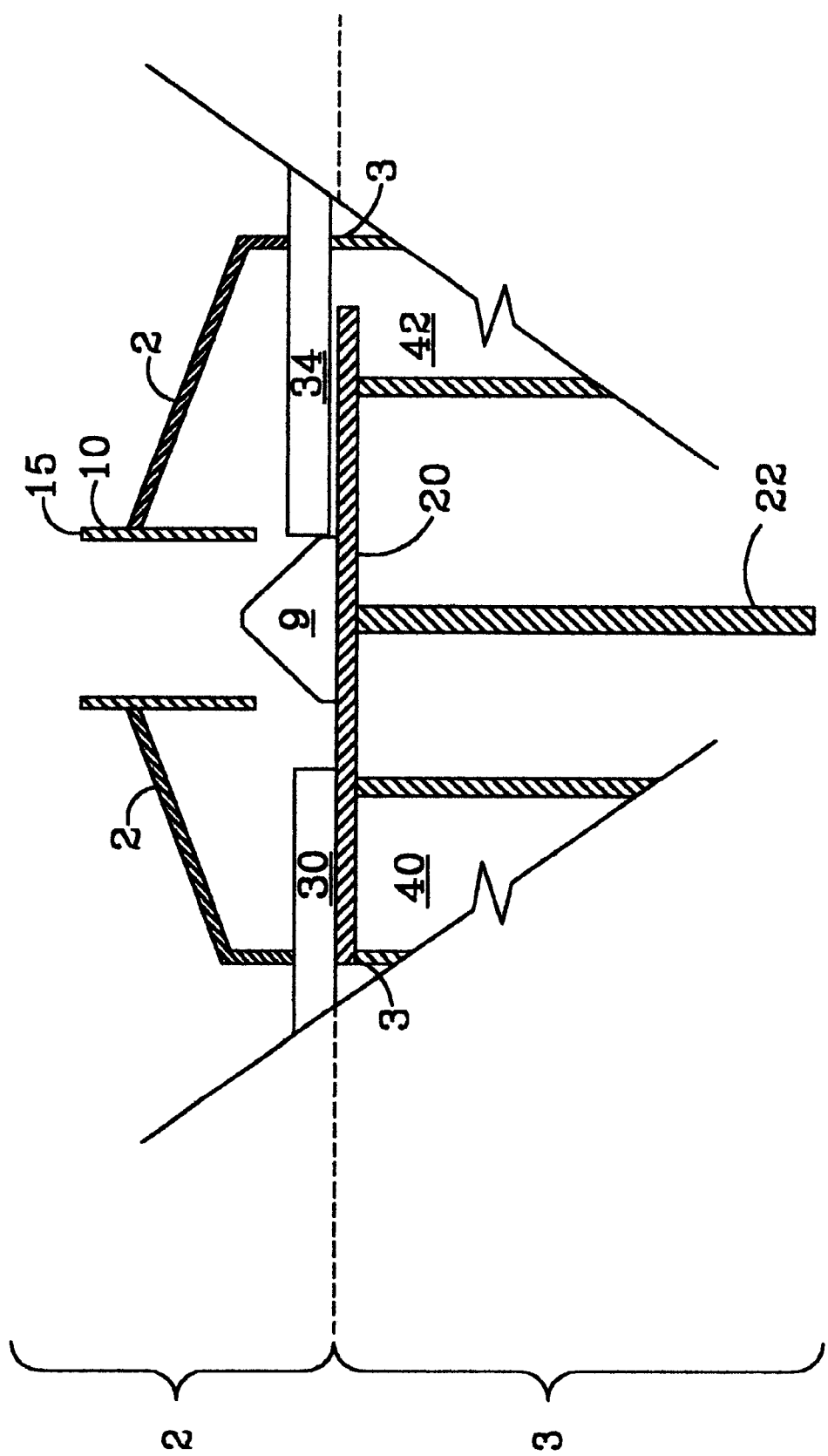
FIG. 6 is a simplified side view of the embodiment of FIG. 5 showing the discriminating plow.
Figure 7:
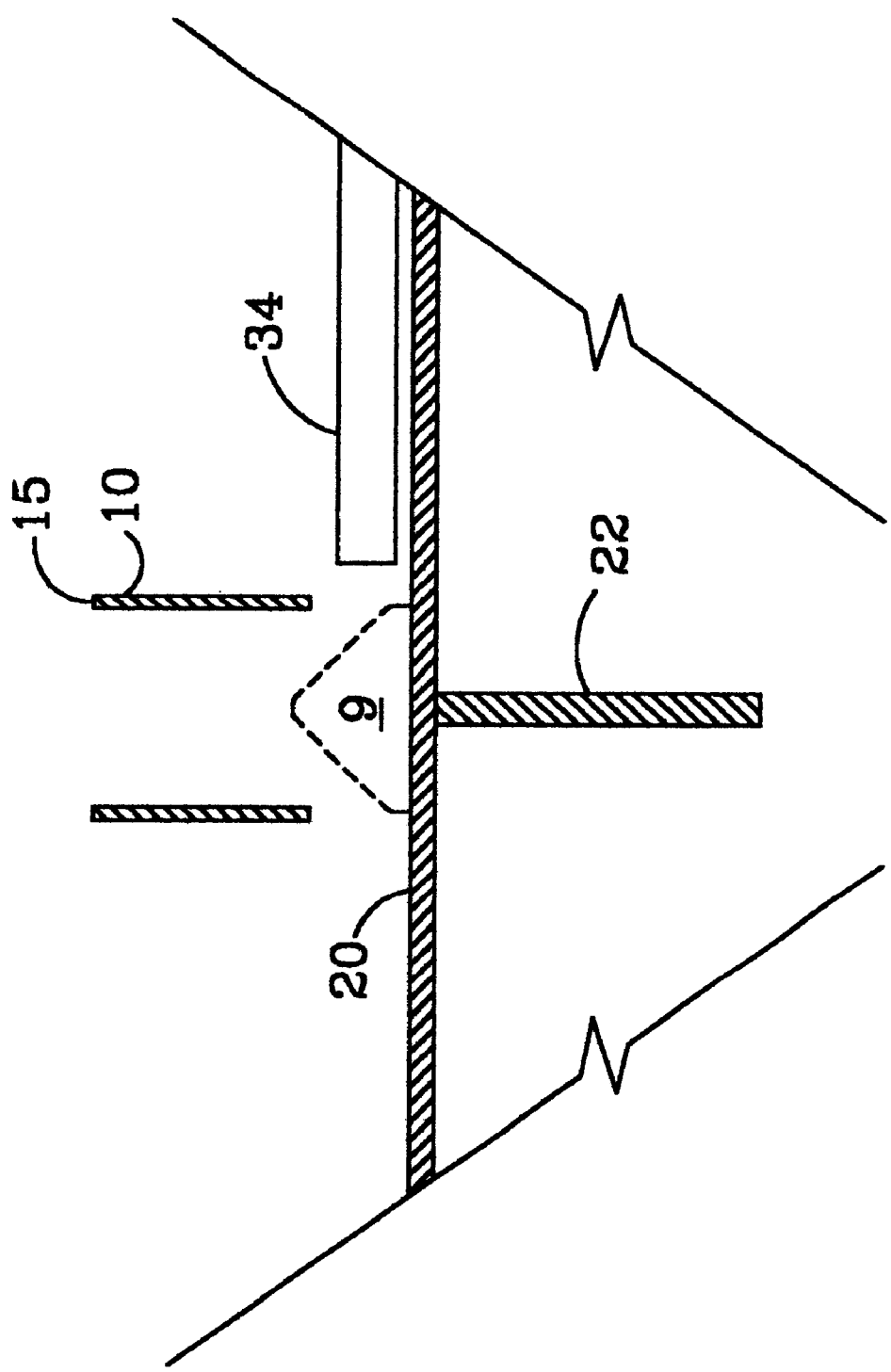
FIG. 7 is a simplified side view of the embodiment of FIG. 5.
Figure 8:
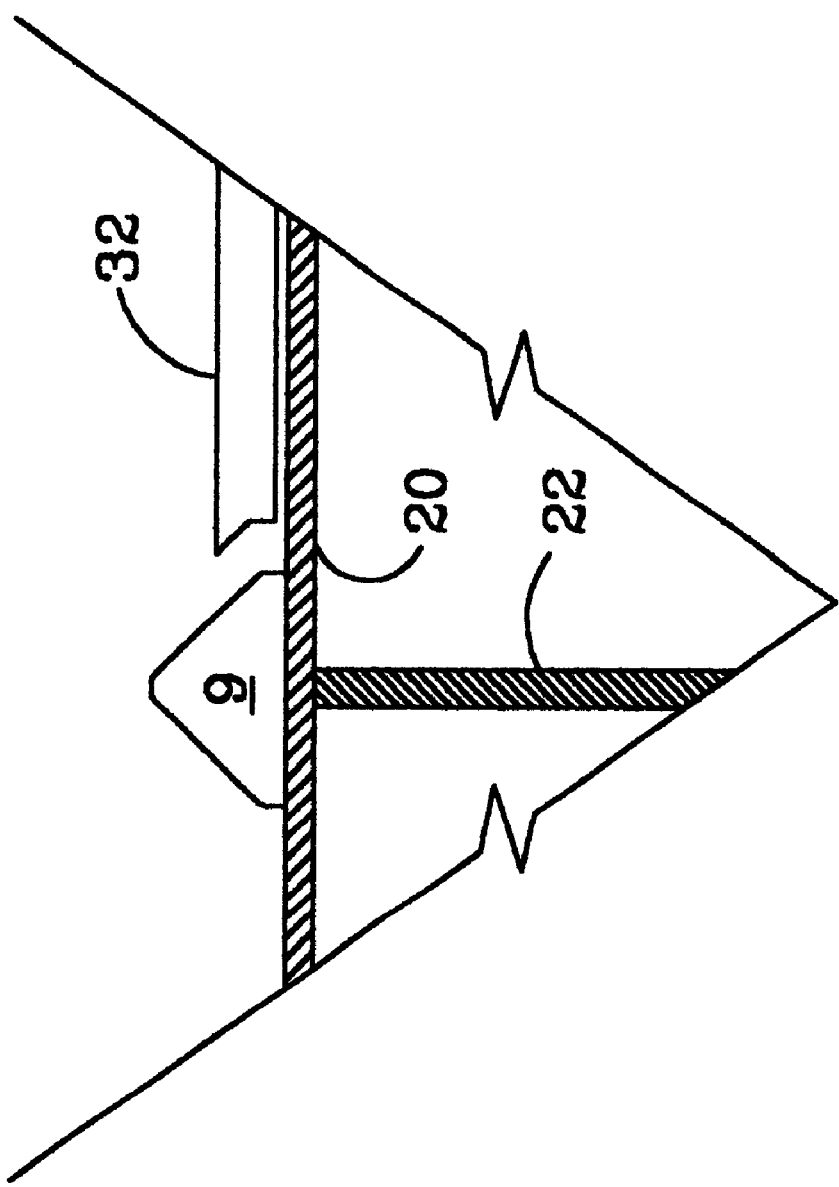
FIG. 8 shows an alternative plow designed to interact with the optional inlet cone.

FIGS. 3, 4, 5, 6, 7, and 8 show an optional inlet cone, 9. The inlet cone is further shown in FIG. 12. The inlet cone is designed to attach to the rotary plate, 20, immediately below the inlet, 10. The cone is attached to the rotary plate by passing a bolt through the bolthole, 51. The cone has a slight offset, 53, and sloped sides at an angle, A, which has been found to be about 40 degrees. In order to save material, a reverse bore, 52, may be made in the cone. Material falls from the inlet, hits the inlet cone, and distributes over the plate. The plow, 30, (or multiple plows—if used) may be inserted up to the cone offset, 53. If required by a sticky material, the plow may be shaped as shown in FIG. 8 and would scrape material from the cone. (See item 32.) The inlet cone assures that all material will be removed from the plate by the plow(s) and would be used in food handling or the like.

Figure 4:
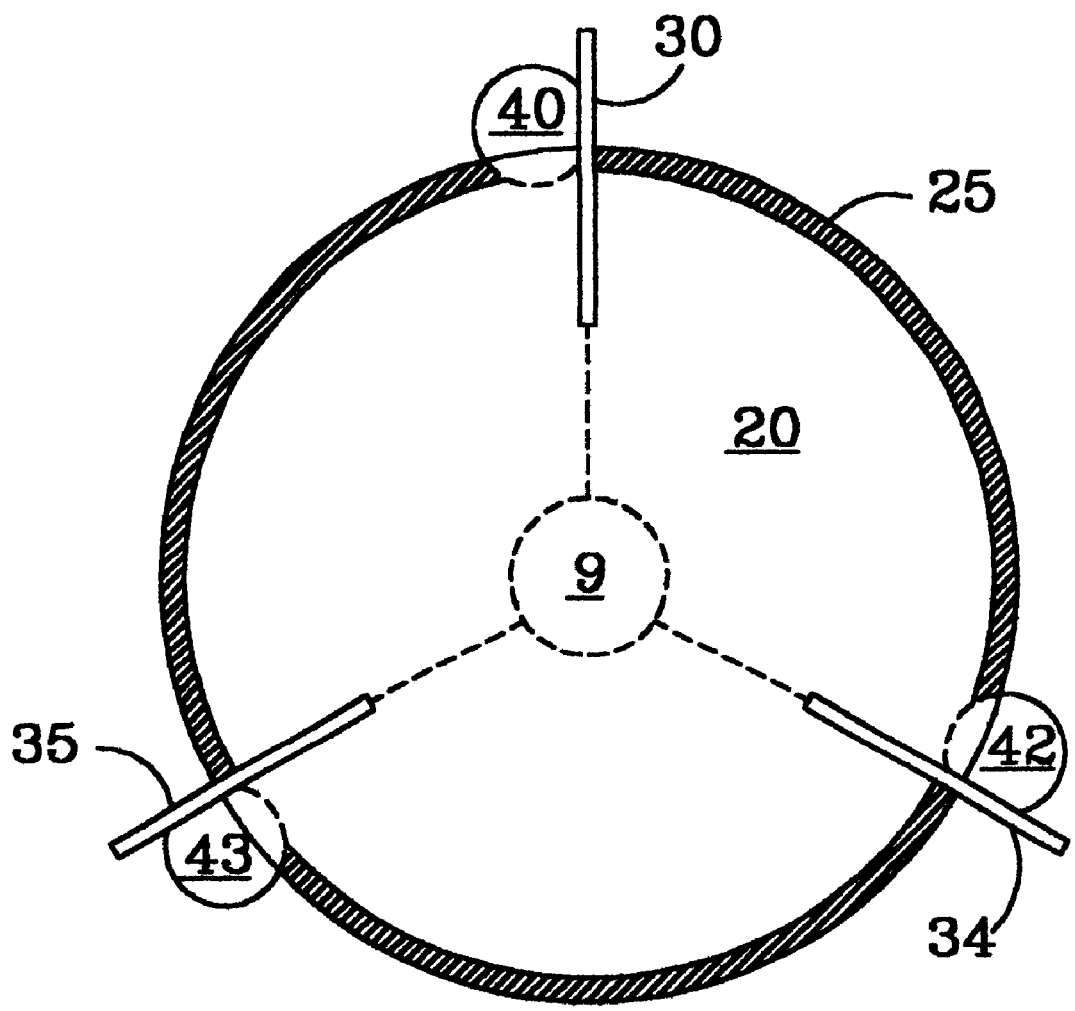
FIG. 4 is a simplified top view of the instant invention showing an embodiment using three plows and three discharge ports.
Figure 5:
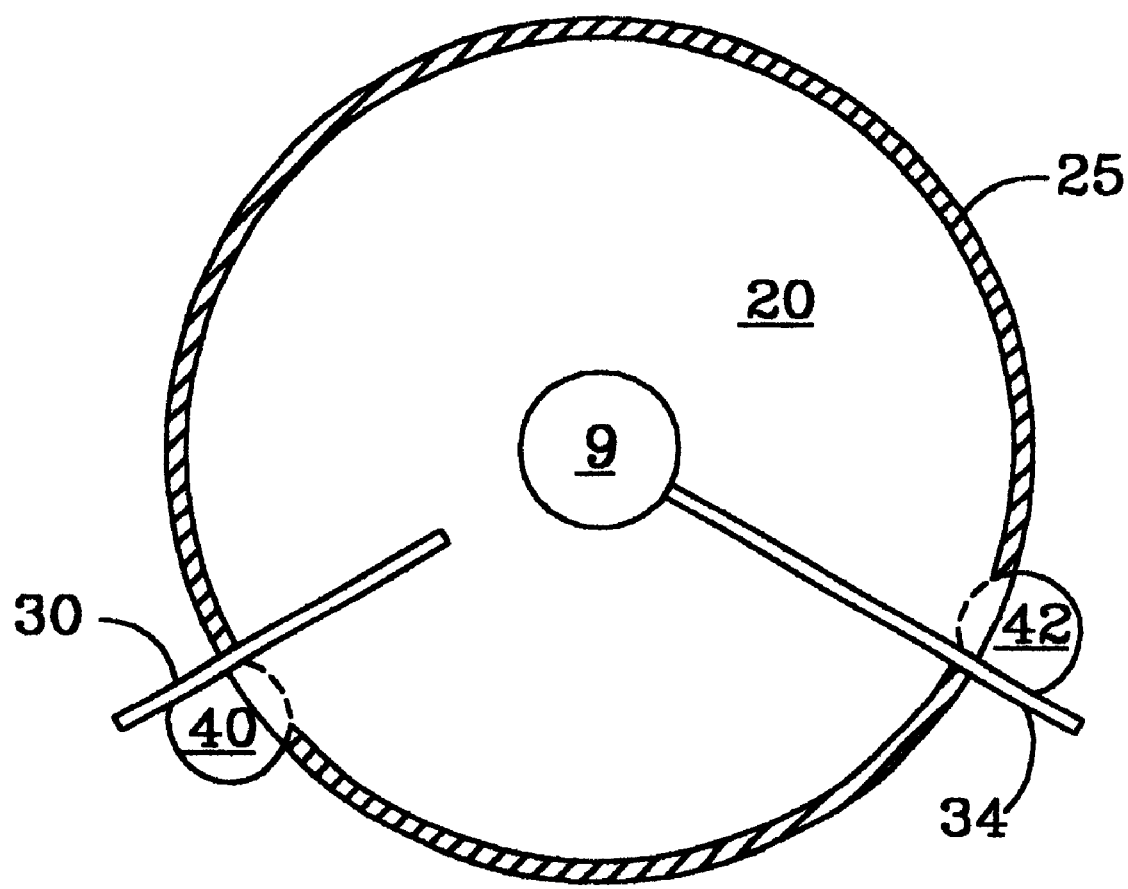
FIG. 5 is a simplified top view of the instant invention showing a n embodiment used to discriminate varying sized material.

As shown in FIGS. 4 and 5 it is possible to use multiple plows to deliver material to a plurality of discharge outlets, 40, 42, and 43. Control of the material removed would be via plows 30, 31, and 35 respectively. The individual systems, however, should operate at the same transfer pressure.

FIGS. 5, 6, and 7 show an interesting application of the feeder valve. Assuming a clockwise rotation of the plate, material would fall from the inlet onto the plate and pass to plow 34. Plow 34 is modified so that it does not run on the surface of the plate; thus, material may pass under the plow, if the material is of a size less than the distance between the plow and the plate. Oversized material—that is material that will not pass under the plow—will be discharged through discharge opening 42. Thus, the instant device can be used to discriminate between material sizes. It would be possible to employ three plows (similar to FIG. 4) but with plows 31 and 35 looking more like plow 34. This would create a device that could select between two sizes of material.

The prototype valve was manufactured using a standard aluminum casting technique. Thus, the preferred material for the valve casing is cast aluminum. Under some circumstances, this type of material might not be appropriate and the manufacturer (or end user) would use a different material such as cast iron, bronze, etc. Small versions of the device could be machined from stainless steel or plastic. Again, a person skilled in the art would be able to make the proper choice of material to meet the circumstances.

The discharge and inlet openings are manufactured with flange mating sections (15 and 45). The flange mating section is mated to flange types specified by the end user. This allows for a series of valve bodies to be manufactured, which can be mated to various, and different sized flanges; thus, reducing the valve body inventory and end cost to the user.

Some discussion has been undertaken on materials for seals and plows and will be expanded. In general, the seals and plows may be fabricated from a number of polymers or metallocenes. The final selection of material would depend on the physical characteristics and temperature of the product to be conveyed. Extremely rough or abrasive materials may even require seals and plows of bronze or one of the silicon carbide materials. For a conveyed product such as some of the ores of copper, lead, molybdenum, or shale of clay, the seals and plows may well be made of maple, oak, or other dense hard wood. A person of reasonable skill in the art should have little problem in making the correction selection.

The rotary plate may be fabricated from cast iron if iron contamination is not a problem. A plate of chilled cast iron, chrome plated, would be suitable for most mildly abrasive and/or corrosive materials or if iron contamination is a consideration. The plate may also be manufactured from one the stainless alloys, if corrosion or contamination is a consideration. In the case of really abrasive material, the plate should be made of NIHARD or NYRESIST.

In the most serve condition, such as high tonnage feeders, the plate would be fabricated from cast iron as the base. The base would then be overlaid (as would other sections within the valve) with manganese steel plates manufactured in segments. The segments would be replaced, during regular maintenance, if and when worn.

What has been disclosed is a rotary plate feeder that overcomes the disadvantages of the current art rotary feeders. The instant invention, because it has no close clearances, will not damage the material being handled. In a similar manner, abrasive products will cause little wear in the valve and, likewise, lumpy products cannot jamb the feeder valve. Because there are no close metal-to-metal clearances, delicate product such as seed and drugs can be handled without damage.

The art contained within the instant invention will reduce total air loss in a pneumatic conveying system when compared to the standard star valve, and horsepower requirements will be substantially reduced because the metal-to-metal clearances, found in a star valve, are not found in the instant invention. As can be expected, valve reliability is superior, and maintenance is easier and less expensive because no element within the invention can bind or drag. Because of the lack of interference between machine parts and the lack of product binding and drag, the instant invention will have superior wear and service characteristics when compared to current art valves. Finally, as has been explained, the device is easily controlled from a central control room.

The choice of preferred materials for the parts forming the instant device has been given within this disclosure; however, as stated in the disclosure certain operating conditions will control the choice. A person skilled in the art of material selection would have little problem in making a proper choice; therefore, changes in material, size, mating flanges, and the like are deemed to fall within the scope of this disclosure. Thus the possibilities are almost endless in adapting the instant device to serve in any situation.

I claim:

1. A rotary plate feeder for use in solids handling systems comprising:

an upper case having an upper portion and a lower portion and having a lower circumference extending about said lower portion, said lower circumference having an inside and an outside;

a lower case having an upper section and a lower section and having an upper circumference extending about said upper section, said upper circumference having an outside;

a lower flange circumferentially attached to said outside of said lower circumference of said upper case;

an upper flange circumferentially attached to said outside of said upper circumference of said lower case;

a rotary plate having a circumference, a center, a top side, and a bottom side;

an inlet port integrally centered within said upper case extending from above said upper portion of said upper case towards said bottom portion of said upper case for depositing solids on said rotary plate;

a bearing case, having a top and a bottom, integrally centered within said lower case extending from near said upper section towards said bottom section thereof, a motor mounting means located at said bottom of said bearing case;

a rotary plate shaft attached to said bottom side of said rotary plate and extending from said center of said plate through said bearing case towards said motor mounting means;

a motor attached to said motor mounting means said motor driving said rotary plate shaft for rotating said rotary plate within said lower case;

a discharge port located on said circumference extending about said upper section of said lower case, said discharge port extending down and away from said upper section;

a perimeter seal riding on said circumference of said rotary plate and sealing between said rotary plate and said inside of said lower circumference of said upper case;

a radially moveable plow extending radially inwards from said lower circumference of said upper case collocated with said discharge port and capable of perpendicularly riding on said rotary plate;

means for controlling the position of said plow for sweeping solids from said rotary plate into said discharge port; and, wherein said upper case and said lower case are bolted together at said upper and lower flanges.

2. The rotary plate feeder of claim 1, further comprising:

an inlet cone attached to said upper side at said center of said rotary plate for the purpose of distributing solids across said rotary plate.

3. The rotary plate feeder of claim 1 further comprising means for controlling motor speed thereby controlling the rotation speed of said rotary plate.

4. The rotary plate feeder of claim 1, wherein said inlet port has a top and a bottom, further comprising:

a movable sleeve wherein said movable sleeve is axially located near said bottom of said inlet port capable of axial movement about said bottom of said inlet between said bottom and said rotary plate; and, means for controlling said axial movement of said sleeve for regulating the deposition of solids on said rotary plate.

5. The rotary plate feeder of claim 4, further comprising:

an inlet cone attached to said upper side at said center of said rotary plate for the purpose of distributing solids across said rotary plate.

* * * * *